United States Patent [19]

Feron et al.

[11] Patent Number: 4,771,185

[45] Date of Patent: Sep. 13, 1988

[54] POWER ADAPTER FOR ELECTRICAL INSTALLATIONS AND ESPECIALLY DOMESTIC INSTALLATIONS

[75] Inventors: Paul Feron, 29 rue A.Delieux, 31400 Toulouse; Daniel Tougne, Cahors, both of France

[73] Assignees: Manufacture d'Appareillage Electrique de Cahors, Cahors; Paul Feron; Electricite de France, both of Toulouse, all of France

[21] Appl. No.: 877,759

[22] Filed: Jun. 24, 1986

[30] Foreign Application Priority Data

Jul. 5, 1985 [FR] France ............................. 85 10327

[51] Int. Cl.⁴ ............................. H02J 3/14; H02J 1/00
[52] U.S. Cl. ............................. 307/39; 307/35; 364/492; 364/493
[58] Field of Search ................... 307/37–39, 307/41, 31, 32, 11, 35; 364/492, 493

[56] References Cited

U.S. PATENT DOCUMENTS

| | | | |
|---|---|---|---|
| 4,208,593 | 6/1980 | Sullivan | 307/39 X |
| 4,216,384 | 8/1980 | Hurley | 307/39 |
| 4,293,915 | 10/1981 | Carpenter et al. | 307/39 X |
| 4,310,770 | 1/1982 | Keener et al. | 307/39 X |
| 4,317,049 | 2/1982 | Schweppe | 307/39 |
| 4,321,477 | 3/1982 | Bartlett . | |
| 4,324,987 | 4/1982 | Sullivan, II et al. | 307/38 X |
| 4,463,432 | 7/1984 | Carter, II | 307/39 X |
| 4,472,640 | 9/1984 | Elmer | 397/35 |
| 4,476,398 | 10/1984 | Hallam | 307/39 |
| 4,510,398 | 4/1985 | Culp et al. . | |
| 4,583,182 | 4/1986 | Breddan | 307/39 X |

FOREIGN PATENT DOCUMENTS 2147841 3/1973 France .
2497013 6/1982 France .

Primary Examiner—William M. Shoop, Jr.
Assistant Examiner—Sharon D. Logan
Attorney, Agent, or Firm—Young & Thompson

[57] ABSTRACT

In order to optimize power supply costs and reduce billing rates in terms of prices charged per kilowatt-hour, the current consumed by a domestic installation is compared with a reference value and the result is transmitted to a microprocessor. As a function of this result, the microprocessor disconnects one or a number of power outputs in cascade and in a programmable order. In addition, the microprocessor receives a signal from one output of a relay which is responsive to rate-change data transmitted over the power distribution network at 175 Hz. When the billing rate is at a high price level, the microprocessor disconnects one or a number of outputs at the same time and as a function of a program established beforehand by the user.

10 Claims, 8 Drawing Sheets

FIG_2

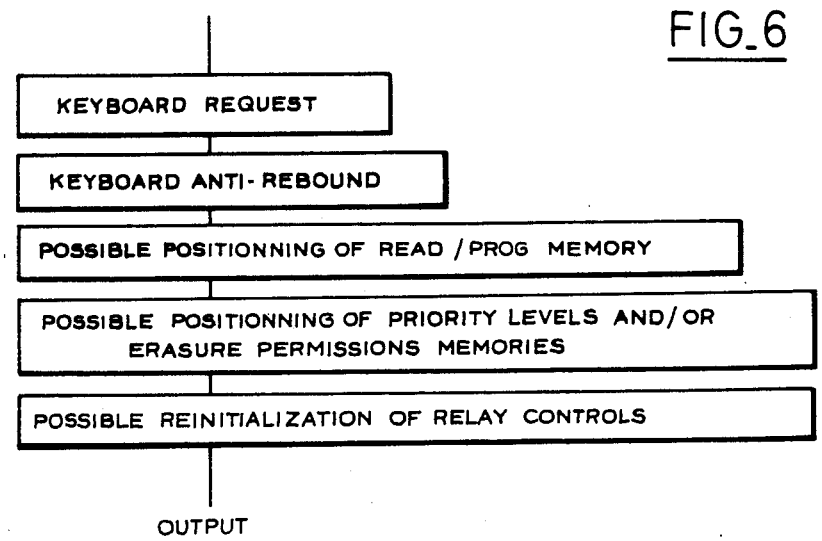
FIG_6
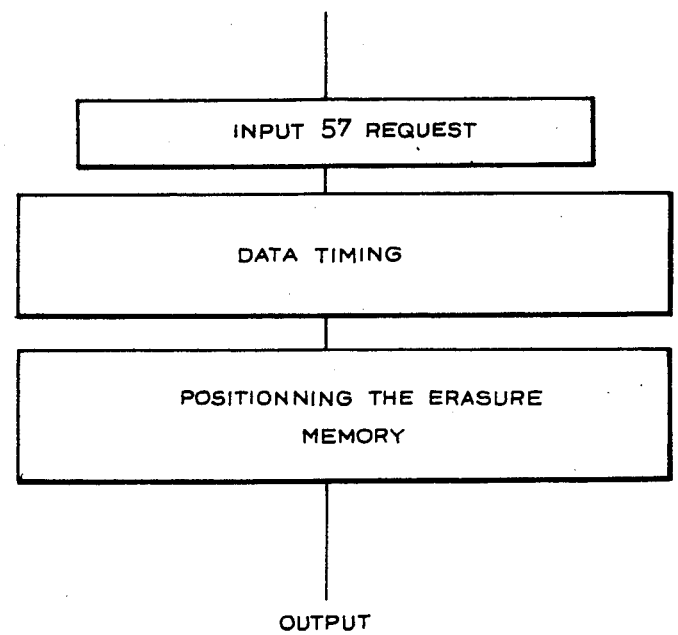
FIG_7

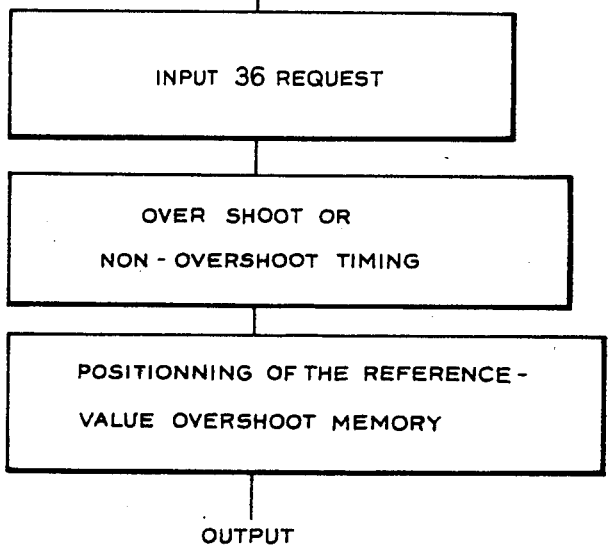
FIG_8
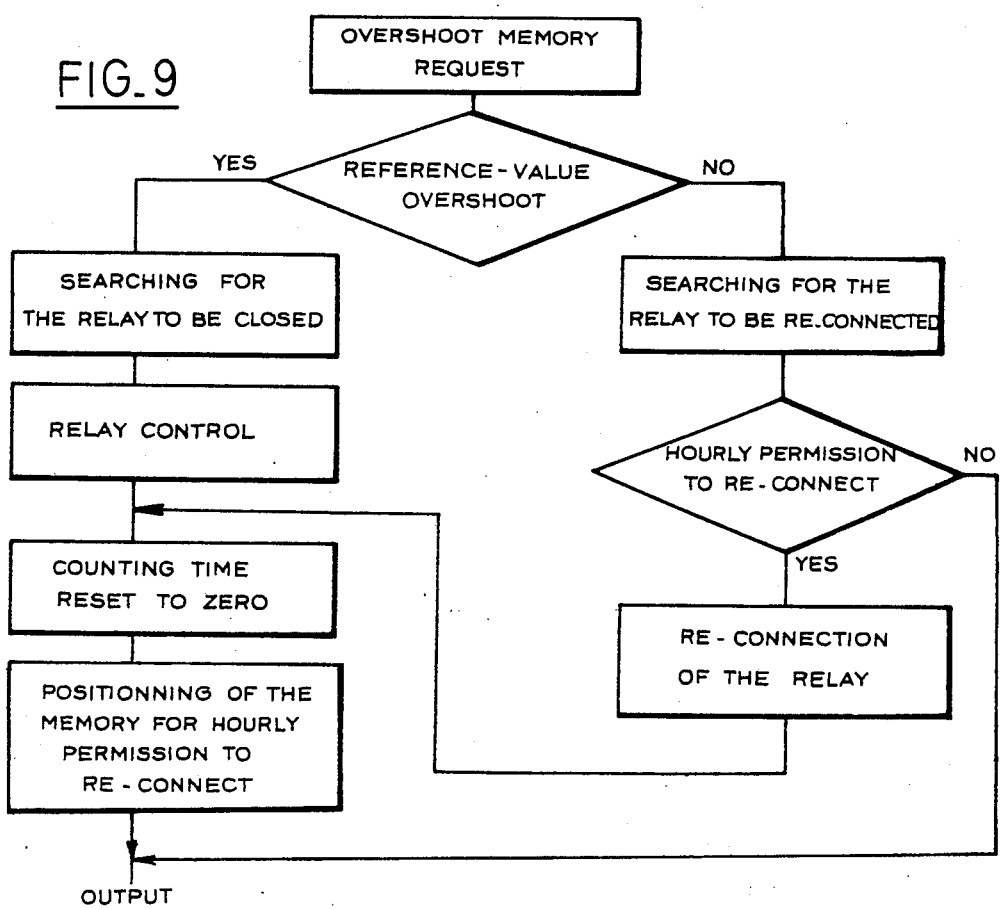
FIG_9

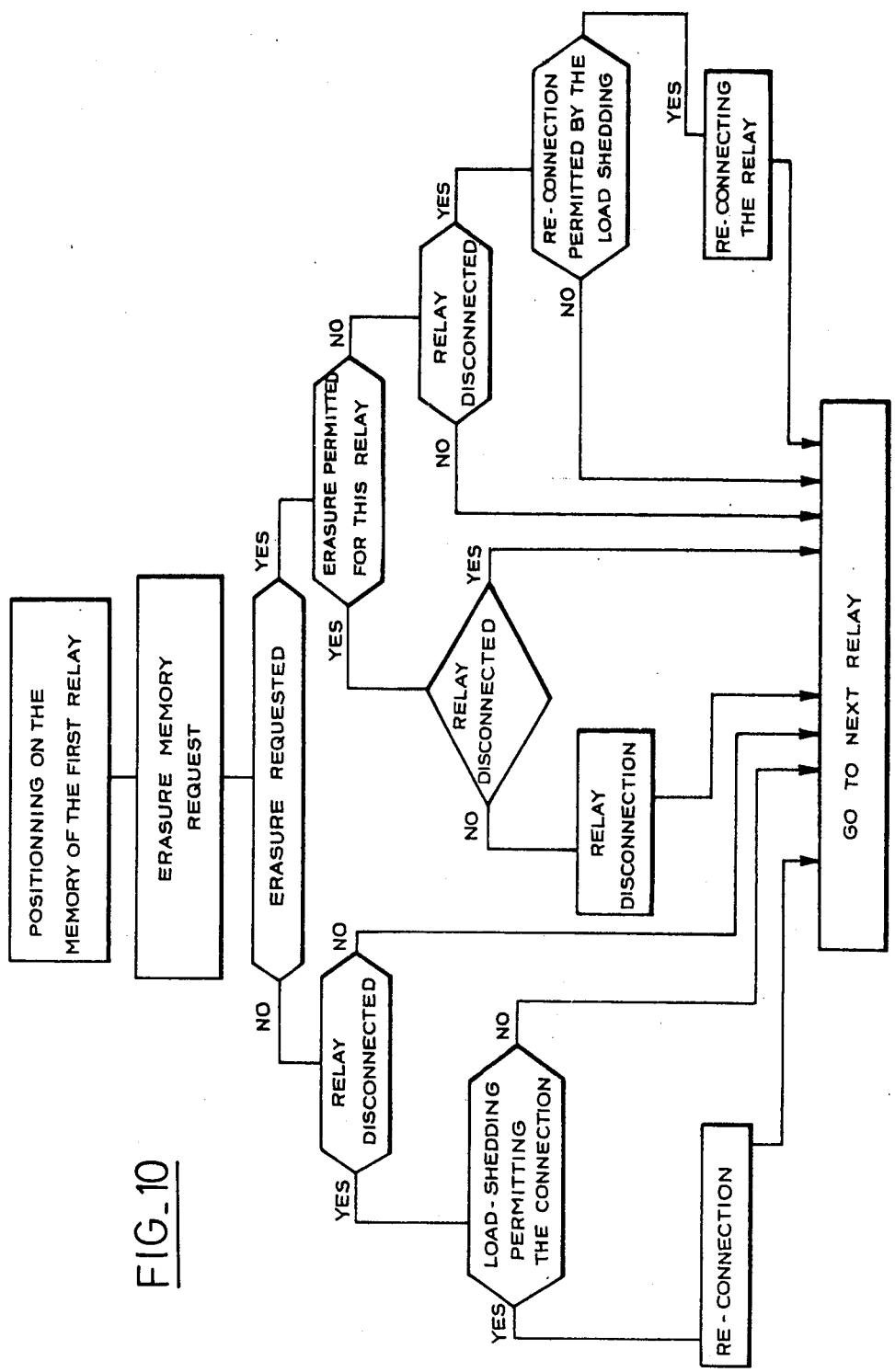
FIG_10

POWER ADAPTER FOR ELECTRICAL INSTALLATIONS AND ESPECIALLY DOMESTIC INSTALLATIONS

BACKGROUND OF THE INVENTION

1. Field of the Invention

The present invention relates to a power adapter for electrical installations and especially domestic installations.

2. Description of the Prior Art

It is already known that the rates charged for electric service by power distribution utilities increase with the maximum power for which the user has applied under service contract. In view of this situation, it has been proposed to adopt units designated as "load-shedders" having one input connected to the output of the general circuit-breaker and a number of power outputs each connected to one or a number of power consumption points. When the consumption exceeds a predetermined threshold value which is slightly lower than the service contract power, the load-shedder automatically disconnects these power outputs in cascade in a predetermined order of priority until the power consumption is restored to the service contract level. Certain units of this type enable the user to program the level of priority of power outputs or in other words the order in which said outputs are disconnected in the event of threshold overshoot.

Another known form of rate schedule is the time-differentiated scale in which the kilowatt-hour price level varies according to the time of day or night, thus giving rise to the night-rate schedule. In another billing system at present in use, a reduced rate is applied on a year-round basis except for a few so-called "peak" days in which the tariff, or billing rate, is particularly high. In the system just mentioned, a warning signal is sent over the network a predetermined time before the high rate comes into effect, thus urging the user to moderate his power consumption. A second signal is then delivered in order to switch the meter to the new billing rate.

SUMMARY OF THE INVENTION

The object of the invention is thus to propose a device for enabling the user both to maintain a moderate maximum power level and to optimize his power consumption as a function of the prevailing rate charged.

In accordance with the invention, the power adapter comprising a power input, a plurality of power outputs and a load-shedding device so designed that when the power consumption oversteps a predetermined threshold value, at least a certain number of power outputs are disconnected in cascade in a pre-established order until said power consumption is restored to said threshold value and said power outputs are subsequently re-connected in the reverse order. The power adapter is essentially provided in addition with means for selectively assigning an erasure permission to at least a certain number of power outputs independently of the pre-established order aforesaid, and with erasing means responsive to a signal which is representative of the power cost, the outputs to which an erasure permission has been assigned being disconnected by said signal when the power cost is at a high value.

The solution proposed in accordance with the invention is surprising. Indeed any one versed in the art could easily have considered a priori that the order for threshold-overshoot load-shedding already defines the power outputs that the user can the most readily dispense with. He would consequently have found it only logical that the outputs which are to be disconnected when power is at a high cost level should be defined as a function of priority orders. However, it has been observed in accordance with the invention that the criteria which serve to determine whether a power output can be disconnected in the event of a threshold overshoot and in the event of a change in billing rate are not necessarily the same. In point of fact, when a threshold overshoot occurs, it is primarily necessary to disconnect a high-power output. During a period of high-cost power supply, the output to be disconnected is rather an output connected to a medium-power appliance which operates over a long period of time. In such a case it is in fact the power consumption which has to be reduced and not the power. For example, in a period of high-cost power supply, the user may desire to disconnect an electric heating unit and put into service an oil-fired heating unit. To this end, the electric igniter of the oil-fired heating unit must be capable of operating even if it consumes a large amount of power since this corresponds only to a low overall electric power consumption when taking into account the very short time during which this power is utilized. On the contrary, during a period of low-cost power supply, the fuel combustion unit serves as an auxiliary heating source and it is not a matter of importance to delay its ignition as a function of the instantaneous power consumed in the installation.

To consider another example: a washing machine or dish-washer follows a predetermined cycle and it is inconvenient if not actually hazardous to interrupt this cycle at any moment. This type of appliance must therefore not be disconnected for an installation load-shed or must at least be disconnected only as a last resort. On the other hand, the full cycle of these appliances corresponds to high power consumption and it is highly advantageous to ensure that they do not operate during periods of high power cost.

There is no unfavorable interaction between the two modes of disconnection. If a power output is in the disconnected state during a high-rate billing period and if, in addition, a power threshold overshoot takes place when this output is the first to be disconnected, the order to disconnect this output so as to reduce the amount of power consumed is clearly without effect. When the power threshold remains in the overstepped condition, the adapter initiates disconnection of the power output which immediately follows in the order of priority.

BRIEF DESCRIPTION OF THE DRAWINGS

These and other features of the invention will be more apparent to those versed in the art upon consideration of the following description and accompanying drawings, wherein:

FIGS. 5 to 12 are flow diagrams corresponding to each function of the microprocessor.

DETAILED DESCRIPTION OF THE INVENTION

Figure 1:
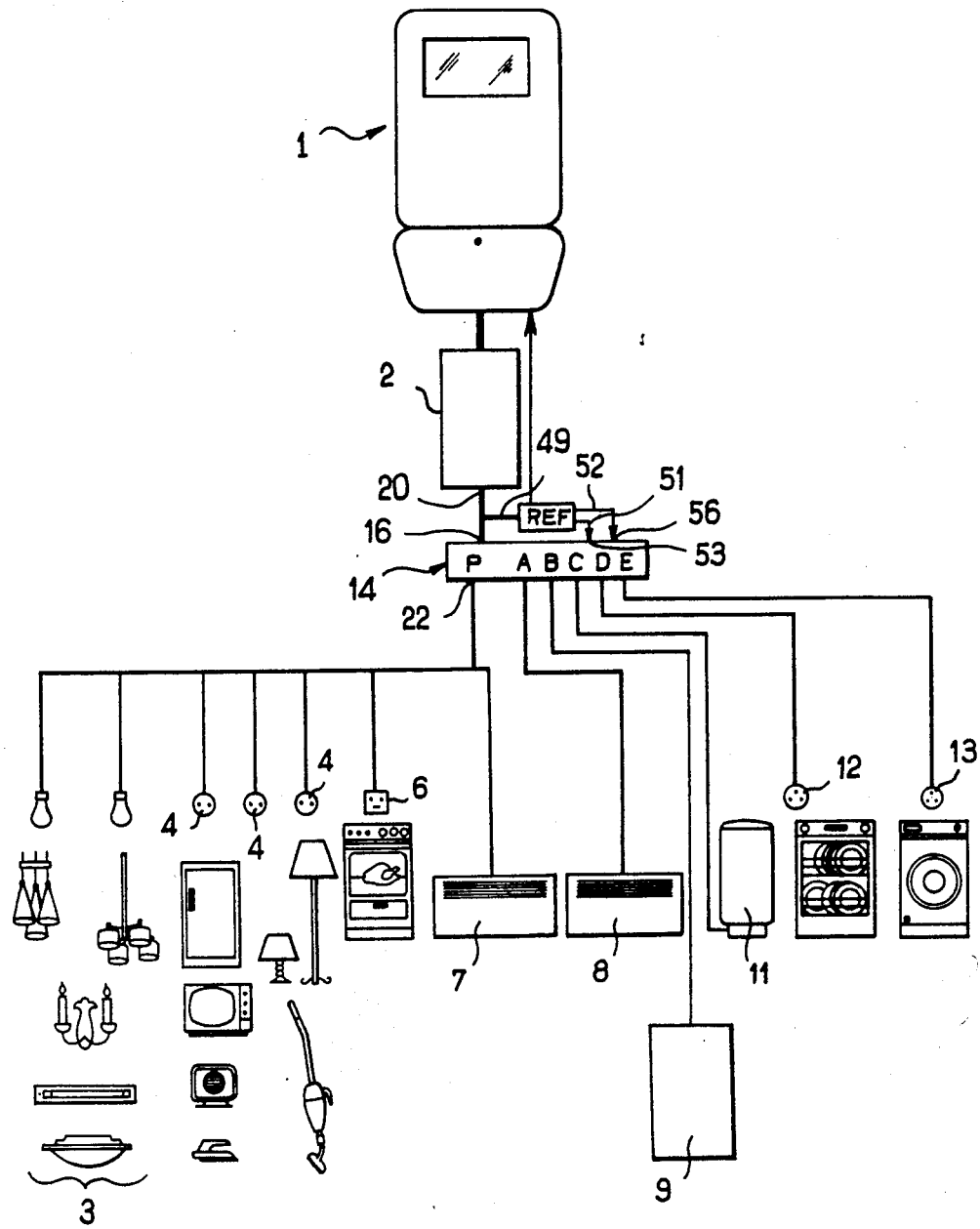
FIG. 1 is a schematic view of a domestic electrical installation which utilizes a power adapter in accordance with the invention.

The example which will now be described relates to a single-phase domestic installation. As shown in FIG. 1, the installation includes a counter 1 which is connected by means of a differential circuit-breaker 2 to different power-consumption points, namely lighting points 3, low-current wall sockets 4, a power socket 6 for an electric cooker, one or a number of electric heating appliances 7 in rooms occupied during the day, one or a number of electric heating appliances 8 in rooms occupied at night, an auxiliary heating appliance 9 with combustion initiated by electric ignition, a water heater 11, a power socket 12 for a dish-washer and a power socket 13 for a washing machine.

The power adapter 14 in accordance with the invention is interposed between the differential circuit-breaker 2 and the entire assembly of appliances.

Figure 2:
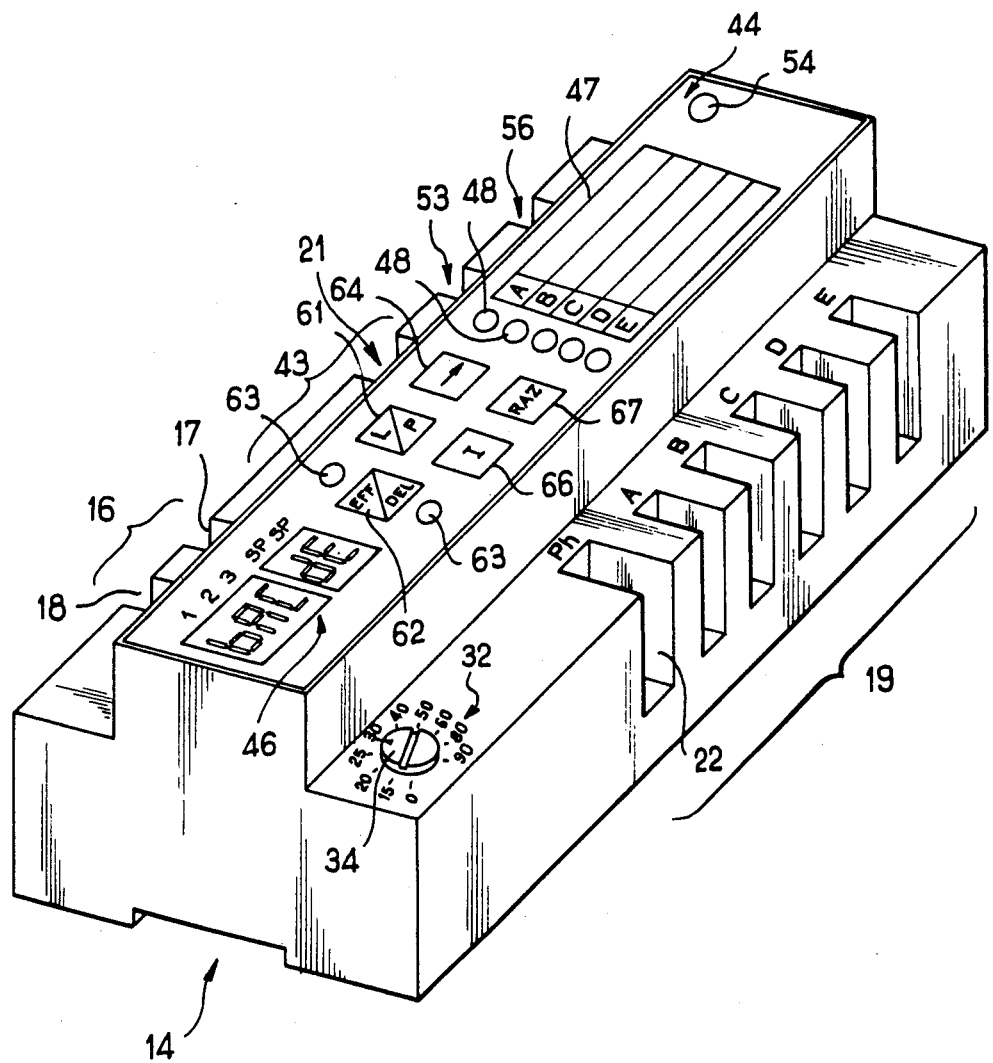
FIG. 2 is a view in perspective of said adapter.

As shown in FIG. 2, the adapter 14 comprises an input terminal block 16 with a phase terminal 17, a neutral terminal 18 and a ground terminal 21. These terminals 17 and 18 are connected to output terminals of the differential circuit-breaker 2 by means of a two-wire link 20 (shown in FIG. 1).

Figure 3:
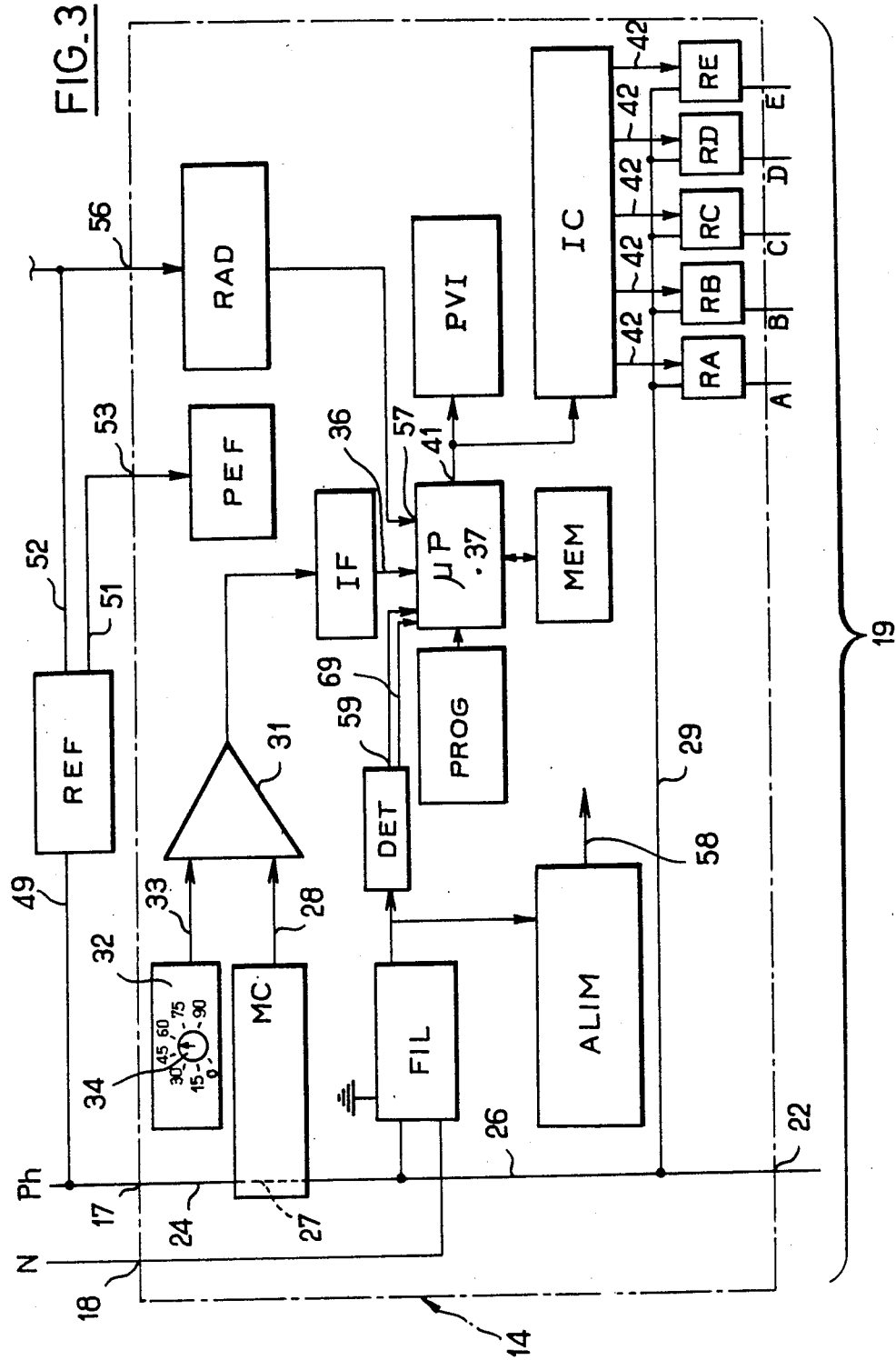
FIG. 3 is a block diagram of the adapter.

The adapter 14 also includes an output terminal block 19 provided with six phase terminals designated respectively by the reference numeral 22 and by the reference letters A, B, C, D, E. As shown in FIG. 3, the so-called "priority" phase terminal 22 is permanently short-circuited with the input phase terminal 17 via lines 24, 26, said lines being connected to each other via a conductive path 27 through a current-measuring device MC, the function of which will become apparent hereinafter.

As shown in FIG. 1, the priority output terminal 22 is connected to the power-consumption points 3, 4, 6 and 7 defined earlier since it is a recognized fact that the supply of these points cannot be interrupted without considerable inconvenience.

The power outputs A, B, C connected in the example under consideration to an appliance for heating rooms occupied at night, to an auxiliary heating appliance and to a water heater are designated as non-priority electrical appliances. The power outputs D and E which, in the example considered, are connected to the dishwasher 12 and to the washing machine 13 respectively are designated as semi-priority electrical appliances. Under conditions which will be described hereinafter, the supply of power to these different outputs A to E can be interrupted by relays (or equivalent devices of the triac type) respectively designated by the references RA, RB, RC, RD, RE (as shown in FIG. 3).

The supply of power to the non-priority outputs A, B, C can be interrupted when the current consumed by the installation exceeds a predetermined threshold value (threshold overshoot condition).

To this end, the current-measuring device MC (shown in FIG. 3) delivers at its output 28 a potential which is a function of the current on the conductive path 27 located upstream of a branch line 29 which connects the line 26 to the outputs A, B, C, D, E through the power stage of the relays RA, RB, RC, RD, RE. The current on the conductive path 27 is therefore the total current consumed by the installation. The output 28 of the measuring device MC is connected to one of the inputs of a comparator 31, the other input of which is connected to the output 33 of a value-setting device 32. The potential which is present on the output 33 of the device 32 is a function of the position of a rotary selector 34 (as also shown in FIG. 2) which is accessible from the exterior of the adapter 14. The selector 34 is displaceable with respect to a scale graduated in amperes. Under service conditions, the index point of the selector 34 is placed opposite to the value in amperes or in watts corresponding to the service contract.

At its output, the comparator 31 delivers a binary signal which assumes one of the levels when the current measured on the conductive path 27 is below a threshold value which is in turn slightly lower than the maximum current for which the user has applied under service contract and assumes the other level when the current measured on the conductive path 27 is higher than said threshold value.

The output of the comparator 31 is connected to an input 36 of a microprocessor 37 via a signal-matching interface IF.

The microprocessor 37 operates in conjunction with a memory MEM and a programmer PROG. The microprocessor 37 has an output 41 which is connected to a visualization peripheral PVI and to a control interface IC, each output 42 of which is connected to each relay RA, RB, RC, RD, RE.

The user has access to the programmer PROG; by means of a keyboard 43 (as shown in FIG. 2) provided on a control panel 44 of the adapter 14. By means of the keyboard 43, the user can define the order in which the non-priority outputs A, B, C have to be disconnected when the current on the conductive path 27 exceeds the threshold value. The visualization peripheral PVI controls a display device 46 provided on the control panel 44 next to the keyboard 43.

The control panel 44 is provided with a label-supporting surface 47 which enables the user to write opposite to the letters A, B, C, D, E the names of the appliances to which these outputs are connected respectively. Indicator lamps 48 are each placed opposite to one of the labels and are controlled so as to be turned-on when power is supplied to the corresponding output.

Supply of power to the non-priority outputs A, B, C and to the semi-priority outputs D, E can be interrupted during periods of "peak-load pricing" or power consumption at high billing rates. In the example herein described, the installation includes a relay REF having an input 49 connected to the phase upstream of the terminal 17, an output 51 or so-called "advance notice" output and a rate change control output 52. The relay REF is responsive to various signals which are carried by the network and the frequency of which is different from the distribution frequency. In response to a first signal or so-called "advance notice" signal, the output 51 of the relay REF is activated. In response to a second signal or rate change signal, the output 52 of the relay REF is activated in this case. The output 51 is connected to an advance notice terminal 53 of the adapter 14, the terminal 53 being connected to the input of a warning device PEF provided within the adapter and incorporating a warning lamp 54 (as shown in FIG. 2) which lights-up when the output 51 is activated. The output 52 is connected to a terminal 56 of the adapter 14. Within the adapter 14, the terminal 56 is connected to an input 57 of the microprocessor 37 via an adaptation relay RAD which, as a function of the state of the output 52, delivers to the input 57 of the microprocessor a binary signal which is acceptable by this latter. On reception of the high-price rate-change signal, the relay REF initiates a transition of its output 52 to the activated state until another type of signal is received on the input 49 of the relay REF in order to indicate restoration of the power supply to the lower rate, or "off-peak" pricing. The state of the microprocessor input 57 is therefore a function of the prevailing rate charged.

In accordance with the conditions which will be explained below, the user has defined beforehand by means of the programmer PROG one or a number of the outputs A, B, C, D, E which he desires to disconnect when the billing rate is at a peak-load level. As a function of this program and of the signal on its input 57, the microprocessor 37 initiates opening of the relays associated with these outputs when the billing rate is at the high value.

A supply unit ALIM draws energy from the line 26 by means of a filter FIL. The unit ALIM supplies current at 10 or 22 volts to all the power-consuming elements of the adapter 14. In order not to complicate the figure unduly, the corresponding connections are represented schematically by the arrow 58. The unit ALIM includes a transformer and a rectifier which are supplied with power from the grid system, and a storage battery for supplying the output 58 in the event of a current interruption in the grid system. The unit ALIM includes means for charging the storage battery as long as necessary from the grid system when this latter delivers current. Between the filter FIL and the unit ALIM is connected a detector DET which delivers at its output 59 a signal having two levels according to whether current is supplied or not supplied by the grid system. This binary signal is delivered to an input of the microprocessor 37. When the occurrence of an interruption of the grid system current supply has been determined from the state of said input by said microprocessor 37, this latter initiates operation in the minimum mode in which only the memory MEM is supplied. Thus the power consumption of the adapter 14 will be of minimum value and the contents of the memory MEM will consequently be maintained as long as possible, taking into account the necessarily limited capacity of the storage battery contained in the unit ALIM.

The display device 46 serves to display five letters A, B, C, D, E, each letter being placed opposite to one of the following five inscriptions 1, 2, 3, SP, SP. Only the letters D and E can appear beneath the inscriptions SP, SP, thus visualizing the fact that the outputs D and E have a semi-priority character. The letters ABC appear in any order beneath the inscriptions 1, 2, 3.

The keyboard 43 is provided with a push-button 61 for choosing between a reading mode and a programming mode. The reading mode prevents the other push-buttons 64 and 66 of the keyboard from producing action on the program which is currently being recorded. Each pressure on the push-button 61 produces a change of mode. A changeover to the programming mode is indicated by flickering of the letter inscribed beneath the numeral 1, namely the letter to which the first priority level is assigned.

A push-button 62 makes it possible to select between on the one hand a load-shedding mode and on the other hand an erasure mode during high billing-rate periods. A respective indicator lamp 63 lights-up in order to indicate the mode chosen. In the load-shedding mode, a letter lights-up beneath each priority level and one of these letters flickers if the programming mode is in operation. In the erasure mode, the outputs which have to be cut-off when the billing rate is high are designated by the sign = instead of the corresponding letter.

A push-button 64 serves to select the priority level in order to modify the programming of this latter as desired. Each pressure on the push-button 64 initiates a changeover from one priority level to the next. The corresponding letter flickers. If the load-shedding mode has been chosen by means of the push-button 62, the push-button 64 does not permit positioning beneath the levels SP. When the level 3 is selected and the user depresses the push-button 64, the adapter returns to level 1. On the contrary, if the erasure mode has been chosen, the push-button 64 makes it possible to select the five priority levels in succession.

The push-button 66 serves to modify the program relating to the selected priority level.

In the load-shedding mode, when the level 1 is selected, a pressure on the push-button 66 produces a changeover to the following letter in the alphabet or produces a return to the letter A if the preceding program was the letter C. Programming of the priority level to which the letter just chosen had hitherto been assigned is automatically modified. Thus it is the letter which had previously been given the level 1 which will now be given this level. Programming of the priority level to which the third output is assigned or in other words the output which is neither the old nor the new output assigned to the level 1 is not modified. The user can again apply pressure on the push-button 66, in which case programming of the level 1 will be reversed with respect to the level which had not been modified in the previous action whilst programming of the level which had been affected by the previous action will this time remain unchanged.

For programming level 2, the procedure is the same except for the fact that, this time, programming of level 1 can no longer be modified. In other words, any action on the push-button 66 is tantamount to a reversal of programs of the levels 2 and 3. Programming of level 3 therefore results from programming of levels 1 and 2.

In the erasure mode, each action produced on the push-button 66 reverses the programming assigned to the output selected by means of the push-button 64. In other words, if the output A had been selected by means of the push-button 64 and if this latter had appeared on the display device 46 in the high-rate condition, a pressure on the push-button 66 produces extinction beneath the numeral 2 in the example shown, which indicates that the output A will be disconnected when the billing rate is high, and a further pressure on the push-button 66 will cause a return to the prior state.

In the event of disturbances in the grid system, the microprocessor may be blocked and the recorded program may be lost. By depressing the control button 67, the microprocessor is reinitialized. The letters A, B, C are inscribed respectively beneath the numerals 1, 2, 3 and all the outputs are programmed so as to be maintained when the billing rate is high. A new programming operation can then be performed.

Figure 4:
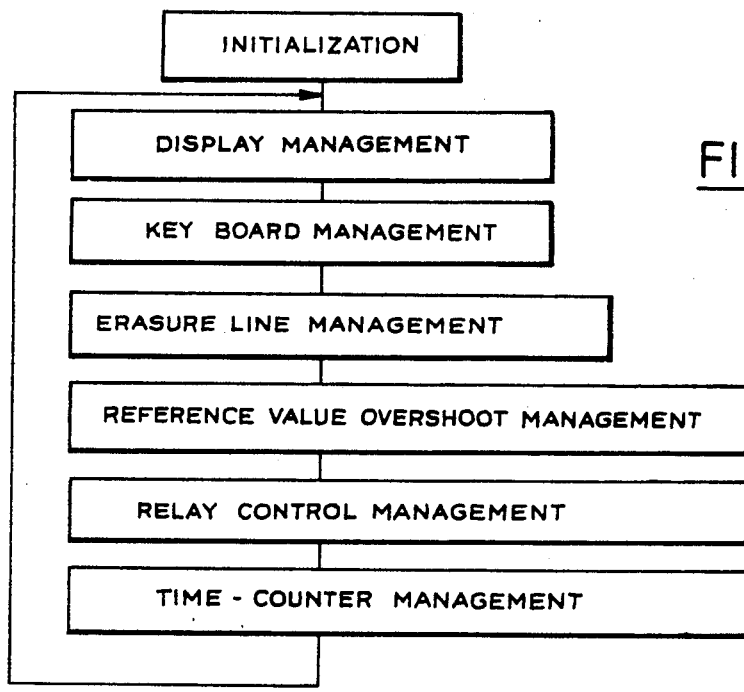
FIG. 4 is a general flow diagram of the microprocessor which is included in the adapter.

FIG. 4 is the general flow diagram of the microprocessor 37. The initialization operation takes place at the time of startup of the adapter each time the control button 67 is depressed. Once initialization has been completed, the following operations take place cyclically : display management, keyboard management, erasure line management, reference value overshoot management, relay control management, and time-counter management.

Before studying these operations in detail with reference to FIGS. 5 to 12, it should first be pointed out that the memory MEM includes a read-only memory (ROM) containing invariable data of the adapter and in particular the programs corresponding to the flow diagrams which will be studied later on. The memory MEM also contains in a random-access memory (RAM) the following data:

one memory per priority level, the content of which is related to the address of the relay which is assigned thereto by the user. One of its binary characters contains the programming of this channel in regard to the peak-hour billing rate and another characterizes a power-supply interruption in the same case;

the display memories which are necessary in order to ensure permanent display;

a time-counting memory;

an erasure memory which indicates whether the present period is a high-billing-rate period or not;

a reference value overshoot memory;

a grid-system-state memory;

a memory for hourly permission to re-connect;

a so-called reading/programming memory which contains the display management mode selected by the user, namely reading/programming and erasure/-load-shedding; said memory also contains the numeral of the flickering character and an indication of the flickering phase (turned-on or extinguished) ;

a memory indicating a change of display.

The initialization operation considered at the beginning of the general flow diagram of FIG. 4 consists in loading the random-access memory (RAM) with a set of data corresponding to the case in which the priority levels 1, 2 and 3 are assigned respectively to the outputs A, B and C, in which all the outputs have to be maintained when the billing rate is high, and in which the reference value is not overstepped. The initialization operation also consists in setting the time-counting memory to zero, in programming a control operation of the relays RA . . . RE which allows them to remain in their closed state, and in initiating the display corresponding to the initial programming operation aforesaid.

Figure 5:
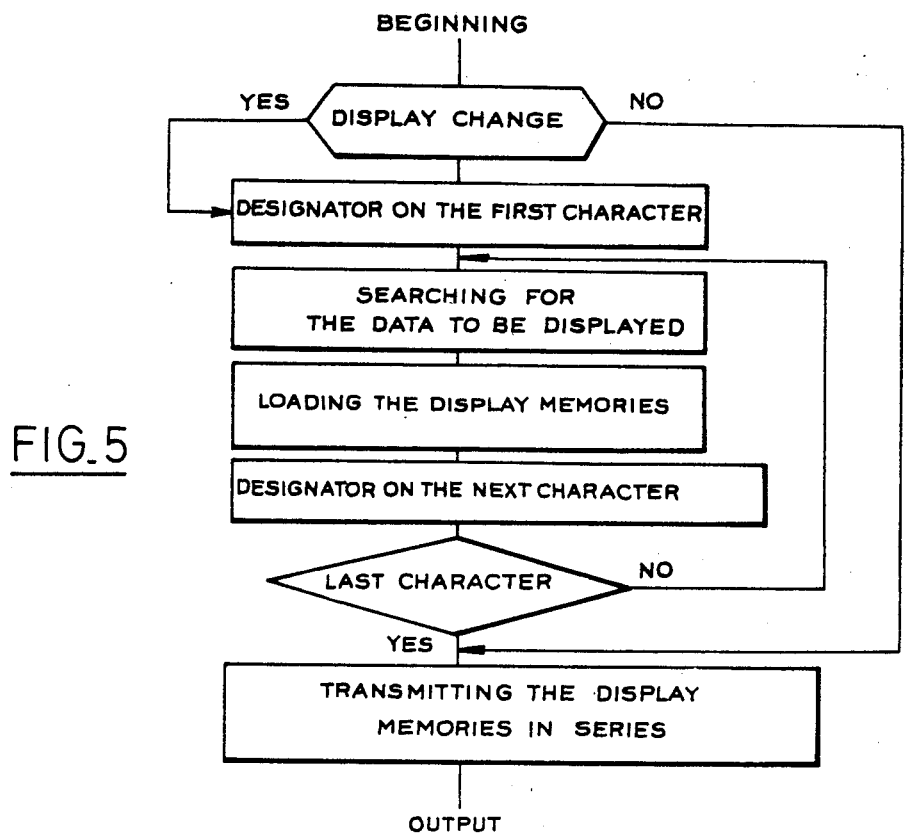

FIG. 5 represents the flow diagram of display management. This flow diagram begins with a test and the result of this test is contained in the memory which indicates a change in programming. If the user has not changed the programming, management of the display simply consists in transmitting the content of the display memories in series. If the user has changed the display, the flow diagram passes through a loop which consists, in the case of each character to be displayed, in carrying out a search for the corresponding data in the memories relating to the load-shedding priority level and to the permissions for erasure in high-rate periods.

FIG. 6 shows the flow diagram relating to keyboard management. The group of "keyboard anti-rebound" instructions serves to record only once an order which has a time-duration equal to several tens of program-cycles. Said group also guards against the effects of parasitic rebounds. In the next step, the memories for "reading/programming", "priority levels" and "erasure permissions" are modified as requirements dictate. The final instruction of the flow diagram consists in immediately modifying the state of the relays RA, . . . RE if a load shed and/or erasure are in progress in order to ensure immediately that the state of all the relays complies with the new programming. This is advantageous since a modification of programming by the programmer may result from the programmer's desire to immediately restore to service a consumption point at which the power supply is at present interrupted by reason of the previous programming.

FIG. 7 relates to management of the erasure memory. The flow diagram consists in searching for the level on the input 57 of the microprocessor, in recording this information only after a predetermined period of time in order to avoid recording a disturbance, then in positioning the erasure memory in such a manner as to ensure that it always indicates the prevailing rate charged.

FIG. 8 relates to management of the reference value overshoot. The flow diagram consists in searching for the state of the microprocessor input 36, in recording this information only after a predetermined period of time, both in order to avoid the consequences of disturbances and in order to record the response time of the relays, then in positioning the reference-value overshoot memory. It is important to permit a current surge since this may result for example from startup of a motor in the installation and it would be a disadvantage if such a current surge were to be immediately attended by a load shed.

FIG. 9 is the flow diagram of management of the relays relating to the reference-value overshoot. If the reference value has been exceeded, a search is made in the priority-level memory for the address of the relay which has to be disconnected in the event of overshoot. This relay is then operated in consequence and the specific memories are modified in order to indicate which relays will henceforth be the first to be disconnected and re-connected respectively. The memory for hourly permission to re-connect changes over to the non-permission state. If the relay which it has just been decided to open had already been actuated to open by reason of an erasure, the reference-value overshoot will not be removed, which will be detected in the following cycle and will then cause opening of that relay which has the next highest priority level.

When no reference-value overshoot occurs, the flow diagram consists in finding out whether it is necessary to re-close any relay which has previously been opened by reason of a load shed. A search for the relay to be re-connected is performed in the same manner as in the other branch of the flow diagram. In a manner not shown in the flow diagram, a test determines whether the present period is one of erasure caused by a high-billing-rate condition. Should this in fact be the case, it is sought to determine whether the relay to be re-connected has in fact to be disconnected for erasure. If this is so, a search is made in the "priority levels" memory in order to find out which relay is the next to be re-closed. If the present period is not erasure period, a check is made in order to ensure that the previous relay-opening operation resulting from a load shed or the previous relay-closing operation within the scope of reference-value overshoot management has in fact taken place more than ten minutes ago. In fact, if a relay has just been opened as a result of a reference-value overshoot, it must be prevented from re-closing immediately since this would at one give rise to another overshoot. If the ten-minute time interval has in fact elapsed, the relay is re-connected and the counting time is reset to zero.

FIG. 10 relates to the management of relays relating to erasure in a high-billing-rate period. The flow diagram shown is concerned with the management of a relay, a loop circuit (not shown) being provided for successively managing the five relays.

In accordance with this flow diagram, the first step consists in determining whether erasure is requested or in other words if the present period under consideration is a high-billing-rate period.

If this is not the case and the relay is disconnected, said relay is is accordingly re-connected unless its specific memory indicates that it has been disconnected as a result of a load shed.

If on the contrary erasure is requested, it is first sought to determine whether the user has permitted erasure of said relay by programming. Should this be the case, the flow diagram disconnects said relay or maintains this latter in the disconnects state if it had already been in this state.

If erasure has not been permitted in the case of this relay which is nevertheless disconnected, this may be explained by a load shed and the relay accordingly remains disconnected or by a modification of programming by a user, in which case the relay is immediately re-connected.

Figure 11:
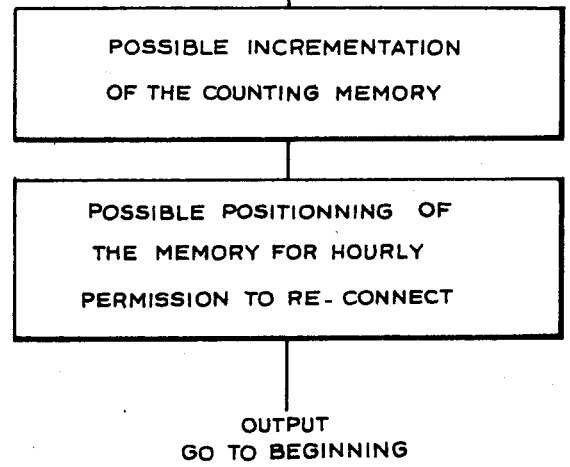

The flow diagram of FIG. 11 relates to management of the time counter. The counting memory is progressively incremented. When its content corresponds to a time interval of ten minutes, the re-connection hourly permission memory assumes the state in which it permits re-connection in the flow diagram of FIG. 9.

Figure 12:
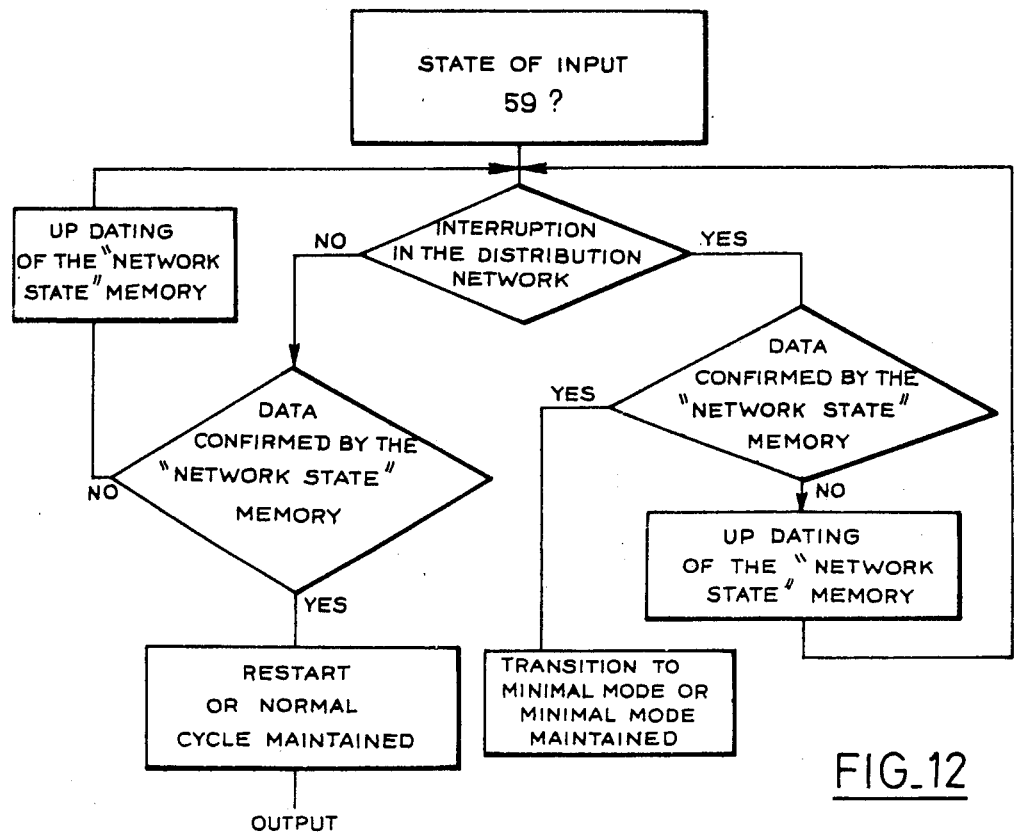

The flow diagram of FIG. 12 relates to management of the adapter in the case of a possible current interruption in the distribution network or grid system. A battery-fed circuit generates an interruption on an output 69 of the detector DET in the event of an interruption of the power system supply. This interruption has priority over any other programmed control operation. When the interruption has been detected, the initial step consists in determining the state of the line 59. Should this latter indicate that the power distribution network is in service, a second test is made in order to find out whether the "network state" memory confirms this information. If this is not the case, the "network state" memory is updated and the logic circuit returns to the first test. If the information is confirmed by the "network state" memory, normal operation of the adapter 14 is maintained or restored.

If a power supply interruption is detected during the initial test, a check is first made in order to determine whether this information is confirmed by the "network state" memory. Should this not be the case, the memory aforesaid is updated and the logic circuit returns to the initial test. If on the contrary the information is confirmed by the memory, the microprocessor initiates a transition to the minimum mode in which only the memory MEM and the detector DET are supplied.

The operation of the adapter described in the foregoing takes place as follows. At the time of startup, the user places the index point of the selector 34 opposite to the numeral corresponding to the maximum number of amperes permitted by the service contract with the power distribution company. By means of the keyboard 43, the user then programs the priority level of each output A, B, C in the event of a necessary load shed and he designates the outputs to be disconnected when the billing rate is high. The user then presses once on the push-button 61 in order to restore the adapter to the reading mode. The display device 46 then operates continuously.

By means of the indicator lamps 48, the user can check whether non-operation of a consumption point results from a disconnection decided by the adapter or from a power failure.

In the event of current threshold overshoot determined by the selector 34, the output which has the assigned priority level 3 is first disconnected, whereupon the output having the assigned priority level 2 is disconnected if necessary, followed by the output which has the assigned priority level 1. If the current consumed remains below the threshold value over a period of more then then minutes after a load shed, the disconnected output which has the highest priority level is re-connected unless it has been erased in order to take into account a high-rate period. As a result of this re-connection and if there still remains at least one disconnected output for load-shedding and if compliance with the current threshold value continues to be maintain, it will be possible to re-connect another output immediately.

If the user is particularly hindered by the disconnection of one of the outputs during an erasure and/or a load shed, he can modify the programming in order to obtain re-connection of said output.

It will be readily apparent that the invention is not limited to the examples described in the foregoing with reference to the accompanying diagrams and many arrangements may accordingly be contemplated without thereby departing either from the scope or the spirit of the invention.

From this it follows that the distinction between a non-priority output and a semi-priority output is not essential and all the outputs which are capable of erasure could also be capable of load-shedding.

Distinct programming and display means could be provided for each of the "erasure" and "load-shedding" functions.

What is claimed is:

1. A power adapter comprising:
   a power input (16)
   a plurality of power outputs (22, A, B, C, D, E),
   a load-shedding device (MC, 31, 32, IF, 37, PROG, MEM, RA, RB, RC), said load-shedding device including:
   (a) means (MC) for detecting the current through the power input
   (b) means (31) for comparing said current with a threshold
   (c) means for successively disconnecting power outputs of said plurality in a pre-established order when said current is higher than said threshold and then successively re-connecting said disconnected power outputs in the reverse of said pre-established order when said current is lower than said threshold
   programming means (PROG) for selectively assigning an erasure permission to at least one power output from said plurality independently of said pre-established order
   input means (56) for receiving a signal representing an external condition, and
   erasing means (37, PROG, MEM, IC, RA) responsive to said signal for selectively disconnecting said at least one power output upon detection of a pre-determined condition of said signal,
   wherein said programming means (PROG) comprise means for programming said pre-established order and said programming means include a programation mode selector (62), for selecting between a load-shedding programmation mode and an erasure programmation mode.

2. A power adapter according to claim 1, wherein at least one power output from said plurality of power outputs belongs to said pre-established oreder and is available for being assigned an erasure permission by way of the programming means.

3. A power adapter according to claim 1, wherein said plurality of power outputs includes at least one semi-priority power output (D, E) which is independent of a load-shedding device but is available for being assigned an erasure permission by way of the programming means.

4. A power adapter according to claim 1, wherein said pluarlity of power outputs includes a priority power output (22) which is permanently connected to the power input (16) and is independent of the load-shedding device and the erasing means.

5. A power adapter according to claim 1, wherein the means for receiving an external signal comprise a control terminal (56) connectable to an output of a relay (REF) which is responsive to a specific frequency signal corresponding to a change of billing rate.

6. A power adapter according to claim 1, wherein the programming means include a first control means (64) for selecting a power output to be programmed, and a second control means (66) for cyclically modifying a correspondence between each power output and a variable being a priority level in a first condition of the programmation mode selector and the erasure permission in a second condition of the programmation mode selector.

7. A power adapter according to claim 6, wherein the first control means (64) includes means for cyclically selecting priority levels characterizing said pre-established order, and the second control means include means for assigning to said levels one of said power outputs and for determining permission for erasure of said output and wherein, in the load-shedding programmation mode the second control means (66) causes a said priority level selected by means of the first control means (64) to be cyclically assigned to the possible power outputs while omitting said outputs which have already been assigned to priority levels.

8. A power adapter according to claim 6, wherein in the load-shedding programmation mode, the first control means (64) automatically omits selection of at least one semi-priority power output (D, E), whereas in the erasure permission programmation mode the first control means (64) cyclically selects for possible assignment of an erasure permission by means of the second control means power outputs (A, B, C, D, E) including said at least one semi-priority power output.

9. An adapter according to claim 6, wherein said adapter includes in addition a device (46) for displaying priority levels and erasure permissions which are assigned to respective said power outputs (A, B, C, D, E).

10. An adapter according to claim 1, adapted to immediately connect and disconnect power outputs (A to E) of said plurality upon a programmation by the user and as a function of said current through the power input (16) and of said signal representing an external condition.

* * * * *